United States Patent [19]

Greskovich et al.

[11] 4,156,614

[45] May 29, 1979

[54] ALUMINA-BASED CERAMICS FOR CORE MATERIALS

[75] Inventors: Charles D. Greskovich, Schenectady; Robert C. DeVries, Burnt Hills, both of N.Y.

[73] Assignee: General Electric Company, Schenectady, N.Y.

[21] Appl. No.: 839,990

[22] Filed: Oct. 6, 1977

[51] Int. Cl.² ............................................. B28B 7/34
[52] U.S. Cl. ............................ 106/38.9; 106/40 R; 106/63; 106/65; 106/73.4; 164/132
[58] Field of Search ............... 106/73.4, 63, 65, 38.9, 106/40 R; 164/132

[56] References Cited

U.S. PATENT DOCUMENTS

| 3,078,173 | 2/1963 | Dolph | 106/63 |
| 3,312,558 | 4/1967 | Miller | 106/40 R |
| 3,643,728 | 2/1972 | Hulse | 164/132 |
| 3,901,733 | 8/1975 | Toy et al. | 106/40 R |
| 4,052,538 | 10/1977 | Eddy et al. | 106/73.4 |
| 4,068,048 | 1/1978 | Desplanches | 106/65 |
| 4,073,662 | 2/1978 | Borom | 106/62 |

FOREIGN PATENT DOCUMENTS

| 49-20365 | 5/1974 | Japan | 106/64 |
| 618248 | 2/1949 | United Kingdom | 106/62 |

*Primary Examiner*—Helen McCarthy
*Attorney, Agent, or Firm*—Donald M. Winegar; Joseph T. Cohen; Charles T. Watts

[57] ABSTRACT

Cores made of alumina-based ceramics, such as β-alumina materials, are substantially non-reactive with directionally solidified eutectic and superalloy materials, do not cause hot cracking of the same, and are easily leachable from the cast metal.

4 Claims, No Drawings

ALUMINA-BASED CERAMICS FOR CORE MATERIALS

BACKGROUND OF THE INVENTION

1. Field of the Invention

This invention relates to materials suitable for making cores for casting directionally solidified eutectic and superalloy materials.

2. Description of the Prior Art

Jet engines are a multi-million dollar business. The maximum operating temperature of these engines must be increased to attain higher efficiencies. Higher operating temperatures require the fabrication of new alloys with high temperature strength, toughness and corrosion resistance.

The most promising method of fabricating the turbine blade components with improved high temperature properties is by directional solidification (DS). The rate of production of blades by the DS process is partly governed by the liquidus temperature which should be as high as possible. The liquidus temperature of many of the promising alloy compositions being explored at this time is greater than 1500° C. and reaches nearly 1800° C. or higher. In order to make "hollowed" blades (which are mandatory for use in jet engines), the alloy is solidified around a ceramic core material which is subsequently leached away, leaving behind the proper air cooling cavities in the blade. Thus far, fused silica is the standard core material used at temperatures up to about 1550° C. without deleterious reaction with many of the alloy compositions. At temperatures exceeding about 1550° C., silica cores are severely attached by one or more of the most reactive elements (Al, Hf, C) of the alloy. Consequently, silica cores cannot be used at the high temperatures required to directionally solidify the alloy. MgO and $Y_2O_3$ cores are found to react only slightly with the aluminum in the alloy during DS at temperatures near 1800° C., but both materials have relatively poor leachabilities.

Although leachability and nonreactivity with the alloy up to 1800° C. are the two primary characteristics of the core material, other desirable characteristics are that it (1) be economical, (2) not undergo more than an overall dimensional change of ~2-4%, (3) have a porosity of from about 25% to about 60% to aid degassing during DS and increase the rate of leachability, (4) exhibit a modulus of rupture of only about 100 psi so that good crushability of the core occurs after the metal is cast, and (5) have good thermal shock resistance.

Considerable data compiled to data on the reactivity between ceramic core materials and nickel-base superalloy materials reveals that the major chemical reaction that occurs is between the ceramic and alumina ($Al_2O_3$). The alumina comes primarily from the oxidation of some of the aluminum which is present in the superalloy composition. Since casting of the superalloy materials is practiced up to about 1800° C., the eutectic temperature of the ceramic compound and the alumina ($Al_2O_3$) should be higher than 1800° C.

It is therefore an object of this invention to provide a new and improved material composition for making ceramic cores for directional solidification of eutectic alloy and superalloy materials.

Another object of this invention is to provide a new and improved material composition for making ceramic cores which is also economical for use in casting directionally solidified eutectic alloys and superalloy materials.

A further object of this invention is to provide a new and improved material composition for making ceramic cores having increased porosity, leachability and crushability characteristics.

Other objects of this invention will, in part, be obvious and will, in part, appear hereinafter.

BRIEF DESCRIPTION OF THE INVENTION

In accordance with the teachings of this invention there is provided a fired ceramic compact suitable for use in a core in the casting and directional solidification of eutectic alloys and superalloy materials. The ceramic material is an alumina-based material such as $\beta$-alumina, $Na_2O \cdot 9Al_2O_3 - Na_2O \cdot 11Al_2O_3$, and other choice candidate materials such as $CaO \cdot 6Al_2O_3$, $SrO \cdot 6Al_2O_3$ and $BaO \cdot 6Al_2O_3$. The ceramic material after firing is characterized by an interconnected network of porosity and solid phase. The density of the fired compact is from about 40% to about 75%.

A desirable material composition can also be produced by admixing up to about 40 parts by weight of pure alumina to each of the alumina-based ceramic compounds and form in situ the interconnected network in which may be found a dispersion of particles of alumina within a matrix of alumina-based compounds.

Cores made of alumina-based ceramics of this invention are easily removed from the cast metal by autoclave leaching techniques embodying solutions of KOH or NaOH. In particular the $\beta$-aluminates, $Na_2O \cdot 9Al_2O_3 - Na_2O \cdot 11Al_2O_3$, are desirable for making the ceramic cores because of their excellent leaching characteristics.

All of the above-identified materials have been found to have little reaction with the cast metal. Cores made therefrom have shown excellent resistance to penetration of the cast metal.

DESCRIPTION OF THE INVENTION

Alumina-based compounds such as $Na_2O \cdot 9Al_2O_3 - Na_2O \cdot 11Al_2O_3$, $CaO \cdot 6Al_2O_3$, $SrO \cdot 6Al_2O_3$ and $BaO \cdot 6Al_2O_3$ have been discovered to be suitable materials for use in making cores for use in casting directionally solidified eutectic alloy and superalloy materials. All of these materials have a minimum temperature at which a liquid phase forms between the compound and alumina ($Al_2O_3$) which is greater than 1800° C. which is the predicted maximum temperature that will be imposed upon the ceramic core material during directional solidification. The alumina-based compounds may comprise at least in part the ceramic material composition used in preparing a ceramic core from the composition. The material composition may consist essentially of 100 parts by weight of an individual alumina-based compound. Alternately the composition may comprise a two phase mixture of from about 60 parts by weight to 100 parts by weight of the alumina-based compounds, balance alumina. When a compact of the material composition is fired to make the core, a continuous phase of the alumina-based ceramic compound is formed in situ which provides either an interconnected network of solid and porous phases or a dispersion of particles of alumina within a porous matrix of alumina-based compounds.

Fired compacts of any of these material compositions, when employed as cores in the casting and directional solidification of eutectic and superalloy materials, are easily removed therefrom by a caustic autoclave processing technique. Removal is achieved by leaching away the interconnected network of the alumina-based ceramic compound with a caustic agent of either a KOH or a NaOH solution.

Another particular feature of material compositions embodying two phase ceramic cores is that the activity of the alumina in the core is nearly equal to that of pure alumina. The activity of the other oxide constituent in the phase mixture, such, for example as $Na_2O$, is considerably reduced so as to decrease its volatility to decrease its possible reactivity with the superalloy melt.

The sodium aluminates and their solid solutions in the compositional range described heretofore, also known as β-alumina, are preferred for making the ceramic cores. Cores made from material compositions including one or more of these sodium aluminates are leachable in a 20% KOH or NaOH aqueous solution at from 200° C. to 350° C. in an autoclave. The process is economical and fairly fast, the leaching rate being on the order of from 0.5 to 1.0 centimeters per hour.

The material composition for core making is prepared by mixing the materials together mechanically. A sufficient amount of the material composition, with or without a binder material admixed therein, is placed in a mold and pressed to a green compact having a desired configuration. The green compact is fired at a temperature of from 1600° C. to 1800° C. to form the core whose material is characterized by a continuous phase of alumina-based ceramic compound formed in situ by sintering. The material structure is characterized by either an interconnected network of solid and porous phases or particles of alumina within a porous matrix of alumina-based compounds. The density of the fired compact varies with the particle size of the materials employed. For a range of particle size of from about 1 micron to about 50 microns, the density of the fired compact ranges from about 40 percent to about 75 percent.

To further illustrate the teachings of this invention, a core 8 cm + 0.6 cm was made of substantially 100 parts by weight β-alumina material ($Na_2O \cdot 9Al_2O_3$). The average particle size of the material used was about 35 microns for a particle size distribution ranging between 5 and 50 microns. The compact was formed at a pressure of 10,000 psi and fired at 1800° C. ± 10° C. to sinter the compact for ease of handling. The density of the sintered rod was 55 percent. A melt of NiTaC-13 alloy was prepared, cast about the rod and directionally solidified thereabout at a temperature of 1675° C. ± 25° C. for 20 hours in a controlled atmosphere of 10% CO by volume of argon gas. The alloy composition, as cast, was as follows:

Nickel — 63.4%
Chromium — 4.4%
Cobalt — 3.3%
Aluminum — 5.4%
Tungsten — 3.1%
Rhenium — 6.2%
Vanadium — 5.6%
Tantalum — 8.1%
Carbon — 0.48%

Upon completion of the directional solidification, examination of the mold-metal interface was made by means of a metallographic polished-section of the β-alumina-NiTaC alloy interface. A thin reaction zone, 10 microns in thickness was observed at the interface. The composition of the material of the reaction zone was α-$Al_2O_3$. No evidence of hot cracking was observed along the interface. The tantalum carbide strength reinforcing phase, approximate composition $Ta_{0.75}V_{0.25}C$, was still present in the cast alloy matrix even at the β-alumina-NiTaC-13 interface. The formation of the thin reaction zone did not hinder the development of the carbide phase near the interface. Upon further examination, no significant penetration of the core had been made by the cast metal and the surface of the casting was commercially acceptable.

We claim as our invention:

1. A fired ceramic core of a ceramic material suitable for use in the casting and directional solidification of superalloy and eutectic materials consisting essentially of a ceramic material which, before firing, consists of one alumina-based compound material having the general formula $MO \cdot NAl_2O_3$, wherein M is $Na_2$, Ca, Sr or Ba, and optionally up to 40 parts by weight of undoped alumina, the average particle size of the ceramic material being from about 1 to 50 microns, the ceramic material, after firing, being characterized by a continuous phase of the alumina - based compound as an interconnected network defining a plurality of interstices in which undoped alumina grains are dispersed, the density of the fired core is from about 40 percent to about 75 percent, the modulus of rupture is only about 100 psi, the minimum temperature at which a liquid phase forms between the compound and the alumina is greater than 1800° C.

2. The fired ceramic compact of claim 1 wherein the ceramic material before firing is a two phase mixture which includes up to 40 parts by weight of undoped alumina admixed to the alumina-based compound material.

3. The fired ceramic compact of claim 1 wherein M is $Na_2$.

4. The fired ceramic compact of claim 2 wherein M is $Na_2$.

* * * * *

UNITED STATES PATENT AND TRADEMARK OFFICE
CERTIFICATE OF CORRECTION

PATENT NO.  : 4,156,614
DATED       : May 29, 1979
INVENTOR(S) : Charles D. Greskovich It is certified that error appears in the above-identified patent and that said Letters Patent are hereby corrected as shown below:

Column 4, line 32, Claim 1, after "Ba," insert therefor

-- N is from 9 to 11 when M is $Na_2$ and N is 6 when M is Ca, Sr, or Ba, --

Column 4, line 41, Claim 1, after "percent," insert therefor

-- and the core material is removable from a solidified casting by autoclave leaching in leaching solutions selected from KOH and NaOH --

Signed and Sealed this

Fifth Day of February 1980

[SEAL]

Attest:

*Attesting Officer*

SIDNEY A. DIAMOND
*Commissioner of Patents and Trademarks*